United States Patent [19]

Huang et al.

[11] Patent Number: 5,717,021
[45] Date of Patent: Feb. 10, 1998

[54] POLYCARBONATE/ABS BLENDS

[75] Inventors: Jianing Huang, Glenmont, N.Y.; Ronald L. Jalbert, Parkersburg, W. Va.; Mark Giammattei, Selkirk, N.Y.; Gregory J. Stoddard, Utsunomiya, Japan

[73] Assignee: General Electric Company, Pittsfield, Mass.

[21] Appl. No.: 751,601

[22] Filed: Nov. 18, 1996

[51] Int. Cl.$^6$ ..................................................... C08K 5/01
[52] U.S. Cl. .......................... 524/484; 524/275; 524/277; 524/487; 524/488; 524/489; 524/502; 524/504; 524/515; 524/525; 524/537
[58] Field of Search ........................ 524/484, 487, 524/488, 489, 502, 504, 515, 525, 537, 275, 277

[56] References Cited

U.S. PATENT DOCUMENTS

| | | | |
|---|---|---|---|
| 2,957,930 | 10/1960 | Jackson | 260/683.15 B |
| 2,999,835 | 9/1961 | Goldberg | 260/42 |
| 3,038,365 | 6/1962 | Peterson | 84/1.26 |
| 3,130,177 | 4/1964 | Grabowski | 260/45.5 |
| 3,334,154 | 8/1967 | Kim | 260/860 |
| 3,629,222 | 12/1971 | Coover, Jr. et al. | 260/93.7 |
| 3,635,895 | 1/1972 | Kramer | 260/47 X |
| 3,985,822 | 10/1976 | Watson | 260/683.15 B |
| 3,997,129 | 12/1976 | Ban et al. | 260/47 XA |
| 4,001,184 | 1/1977 | Scott | 260/47 XA |
| 4,027,087 | 5/1977 | Satoh et al. | 260/17.4 R |
| 4,061,780 | 12/1977 | Yoshida et al. | 424/358 |
| 4,078,020 | 3/1978 | Rose et al. | 260/897 A |
| 4,103,078 | 7/1978 | Sato et al. | 340/854 |
| 4,119,267 | 10/1978 | Kydonieus | 260/737 |
| 4,131,575 | 12/1978 | Adelmann et al. | 260/17.4 R |
| 4,178,281 | 12/1979 | Horn, Jr. | 260/45.8 R |
| 4,230,827 | 10/1980 | Myers | 525/121 |
| 4,311,807 | 1/1982 | McCullough, Jr. et al. | 525/107 |
| 4,384,108 | 5/1983 | Campbell et al. | 528/196 |
| 4,431,570 | 2/1984 | Johnson | 502/151 |
| 4,431,571 | 2/1984 | Karayannis | 502/151 |
| 4,431,572 | 2/1984 | Karayannis et al. | 502/151 |
| 4,529,791 | 7/1985 | Glass | 528/196 |
| 4,923,961 | 5/1990 | Vitands et al. | 528/482 |
| 5,012,030 | 4/1991 | Lane et al. | 585/522 |
| 5,041,491 | 8/1991 | Turke et al. | 524/425 |
| 5,177,277 | 1/1993 | Eryman et al. | 585/255 |
| 5,225,486 | 7/1993 | Money et al. | 525/113 |
| 5,369,154 | 11/1994 | Laughner | 523/436 |
| 5,441,816 | 8/1995 | Grohman | 428/520 |

OTHER PUBLICATIONS

Amoco Chemical Company, Bulletin 12-N, *Amoco Polybutene—The versatile ingredient for improved product performance and value.*
GTSR No. 120, D.D. Heinrich, Jun. 1995—*Acrylonitrile-Butadiene-Styrene Modification Using Amoco® Polybutene.*
Plastics World, Nov. 1995—*Impact Modifiers—How three types of ABS improve, modified with three grades of polybutene.*
Amoco Chemicals Bulletin 12–23b–Amoco® Polybutene Physical.

*Primary Examiner*—Edward J. Cain

[57] ABSTRACT

The present invention involves blends of polycarbonate resin with rubber grafted terpolymer resin, one or more styrenic rigid coplymers wherein a small amount of an aliphatic $C_4$ to $C_{16}$ polyalpha olefin homopolymer or copolymer or its functionalized derivatives is included in the blend.

16 Claims, No Drawings

POLYCARBONATE/ABS BLENDS

BACKGROUND OF THE INVENTION

1. Field of the Invention

The present invention relates to novel polymeric blends, and more particularly, relates to blends comprising one or more polycarbonate resins, one or more grafted ABS resins, a rigid SAN polymer and an effective amount of aliphatic $C_4$ to $C_{16}$ polyalpha olefin, functionalized aliphatic polyalpha olefin polymer or a hydrogenated polyalpha olefin.

2. Description of the Related Art

Polycarbonate resins are tough, rigid engineering thermoplastics having good impact strength. They, however, have poor flow characteristics which sometimes causes difficulties in processing. Various prior art attempts have been made to blend polycarbonate resins with other polymeric modifiers to solve this problem while still retaining the toughness and impact resistance of the polycarbonate resin. For example, acrylonitrile-butadiene-styrene (ABS) graft copolymers have been blended with polycarbonate resins to yield a lower cost blend having improved processing characteristics. While retaining good impact resistance (See U.S. Pat. No. 3,130,177 issued to Grabowski, and Plastics World, November 1977, pp. 56–58). These types of materials have been widely used in automobile, electric and electronic industries. Scientists in this field continue to look for new solutions to improve the processability of polycarbonate/ABS blends in order to make these materials more suitable for automotive interior and exterior applications as well as thin-wall applications.

As the result of recent studies at General Electric Company, applicants have unexpectedly found that by incorporating a small amount of a polyaliphatic $C_4$ to $C_{16}$ olefin, specifically polybutene or an epoxy functionalized polybutene, into the polycarbonate/ABS blends, the processability of the polycarbonate/ABS blends are substantially improved by increasing melt flow without losing low temperature ductility and modulus.

SUMMARY OF THE INVENTION

According to the present invention, there is now provided a polymeric blend comprising:

(A) from 10 to 90 percent by weight of polycarbonate;

(B) from 5 to 50 percent by weight of a rubber grafted resin;

(C) from 5 to 70 percent by weight of a styrene resin copolymer or terpolymer; and (D) from 0.1 to 8 percent by weight of an aliphatic $C_4$ to $C_{16}$ polyalpha olefin.

DETAILED DESCRIPTION OF THE INVENTION

The polycarbonate resins usefully employed according to the present invention are those previously known and described in the prior art. In general, the polycarbonate resins can be prepared from one or more hylogen-free multihydric compounds by reacting the multihydric compounds such as a diphenol, with a carbonate precursor such as phosgene, a haloformate or a carbonate ester such as diphenyl or dimethyl carbonate. The preferred diphenol is 2,2-bis(4-hydroxyphenyl) propane (also referred to as bisphenol A). Generally speaking, such polycarbonate polymers may be typified as possessing recurring structural units of the formula: —(—O—A—O—C(=O)—)$_n$—, wherein A is a divalent aromatic radical of a dihydric phenol or halogen or alkyl substituted phenol at both the 3 and 5 position employed in the polymer producing reaction. Preferably, the carbonate polymers used in this invention have an intrinsic viscosity (as measured in methylene chloride at 25° C.) ranging from about 0.30 to about 1.00 dl/g. The dihydric phenols which may be employed to provide such nuclear aromatic compounds, containing as functional groups two hydroxy radicals, each of which is attached directly to a carbon atom of the aromatic nucleus. Typically dihydric phenols include but are not limited to 2,2-bis(4-hydroxyphenyl)propane;

hydroquinone;

resorcinol;

2,2-bis(4-hydroxyphenyl)pentane;

2,4'-(dihydroxyphenyl)methane;

bis-(2-hydroxyphenyl)methane;

bis-(4-hydroxyphenyl)methane;

2,4'-dihydroxynaphthalene;

bis-(4-hydroxyphenyl)sulfone;

bis-(3,5-dimethyl-4-hydroxyphenyl)sulfone;

bis-(3,5-dimethyl-4-hydroxyphenyl)propane;

bis-(3,5-dihalo-4-hydroxyphenyl)propane;

bis-(3,5-dihalo-4-hydroxyphenyl)sulfone;

2,2'-bishydroxyphenylfluorene;

1,1-bis(4-hydroxyphenyl)cyclohexane;

4,4'-dihydroxydiphenylether;

4,4'-dihydroxy-3,3'dihalodiphenylether; and 4,4'-dihydroxy 2,5 dihydroxydiphenylether.

Other dihydric phenols which are also suitable for use in the preparation of the polycarbonates are disclosed in U.S. Pat. Nos. 2,999,835, 3,038,365, 3,334,154 and 4,131,575. Branched polycarbonates are also useful, such as those described in U.S. Pat. Nos. 3,435,895 and 4,001,184.

These aromatic polycarbonates can be also copolymerized with linear or branched aliphatic $C_5$ to $C_{12}$ diols or diacids or polysiloxanes or linear or aromatic polyesters, otherwise know as polyester-carbonates.

The polycarbonate resins can be prepared from these raw materials by any of several known processes such as the known interfacial, solution or melt processes.

In general, the polycarbonate resin is employed in amounts to maintain the desired physical properties of the resin blend compositions, including their heat resistance and toughness. One or more polycarbonate resins are typically incorporated into the blend of the present invention in amounts of about 10 to 90 weight percent, preferably about 30 to 85 weight percent, more preferably to about 60 to 75 weight percent and most preferably about 64 to 73 weight percent. In cases where more than one polycarbonate resins are incorporated, the ratio of the first polycarbonate to the second polycarbonate may vary from about 10 to 90 to about 90 to 10 weight percent.

Acrylonitrile-butadiene-styrene (ABS) terpolymer of the present invention is well known in the art. ABS is a two-phase system based on a styrene-acrylonitrile (SAN) copolymer continuous phase and a dispersed elastomeric phase typically based on butadiene rubber. Small amounts of styrene and acrylonitrile are grafted onto the rubber particles to compatibilize the two phases.

The styrene-acrylonitrile rigid resin is typically incorporated into the blend of the present invention in amounts of about 5 to 70 weight percent, preferably about 10 to 50 weight percent, more preferably 14 to 30 weight percent of the total rigid resin.

Three major processes which can be used to prepare ABS include emulsion, bulk/mass and suspension polymerization or combinations thereof. The emulsion polymerization of ABS is a two step process involving polymerization of butadiene to form a rubber latex, followed by addition and polymerization of acrylonitrile and styrene during which grafting to the rubber and production of the SAN continuous phase takes place. The rubber content of an ABS graff when made in emulsion may range from 10 to 90 weight percent and the SAN will be grafted from 10 to 90 weight percent of the ABS graft composition. The ratio of the styrene to acrylonitrile ranges from 50:50 to 85:15. When made in emulsion, the rubber latex will have a particle size ranging from about 0.15 to about 0.8 microns by weight, preferable 0.3 microns. Compositionally, the rubber phase may be comprised of polybutadiene, styrene-butadiene or butadiene-acrylonitrile copolymers, polyisoprene, EPM (ethylene/propylene rubbers), EPDM rubbers (ethylene/propylene/diene rubbers containing as diene, a nonconjugated diene such as hexadiene-(1.5) or norbornadiene in small quantities) and crosslinked alkylacrylate rubbers based on $C_1$–$C_8$ alkylacrylates, in particular ethyl, butyl and ethylhexylacrylate. One or more rubber grafted resins from about 10 to 90 and about 90 to 10 weight percent may also be used. The latex emulsion is broken and the ABS is recovered at the end of the polymerization. In the bulk process, the polymerization is carried out in styrene/acrylonitrile monomer rather than in water. Instead of making the rubber, a pre-produced rubber is dissolved in the monomer solution. The rubber-monomer solution is then fed into the reactors and grafting/polymerization is carried out. When produced via a bulk or bulk-suspension process, the soluble rubber will range from 5 to 25 weight percent and the dispersed rubbery phase will have a diameter ranging from about 0.5 microns to about 10 microns. A large weight percent of the free SAN phase is present depending upon the amount of rubber employed.

In place of styrene and acrylonitrile monomers used in the grafted or free rigid resins, monomers such as, alpha methyl styrene, para-methyl styrene, mono, di or tri halo styrene, alkyl methacrylates, alkyl acrylates, maleic anhydride, methacrylonitrile, maleimide, N-alkyl maleimide, N-aryl maleimide or the alkyl or halo substituted N-aryl maleimides may be replaced for the styrene or acrylonitrile or added to. Like the bulk process, suspension polymerization uses rubber dissolved in the monomer solution, but after polymerizing SAN to low conversions, the rubber/SAN/monomer mixture is suspended in water and the polymerization is completed.

It is preferable to use high flow SAN in this invention. High flow SAN are SAN with weight average molecular weights ranging from about 30,000 to about 75,000, preferably from about 45,000 to about 72,000, more preferably from about 50,000 to about 66,000, and most preferably from about 55,000 to about 64,000, and polydispersity of Mn/Mw=2-5.

However, when case bulk/mass ABS is used in the PC/ABS blend, the molecular weight distribution of SAN can be higher with polydispersity of Mn/Mw=2-8. The weight average molecular weight could vary from 72,000 to 130,000, where the number average molecular weight could vary from 15,000 to 42,000.

In general, ABS is employed in amounts of at least about 5 weight percent of the total resin blend, preferably about 20 to 40 weight percent and most preferably about 25–38 weight percent.

The $C_4$ to $C_{16}$ aliphatic polyalpha olefins contemplated in this invention are prepared by polymerizing one or more $C_4$ to $C_{16}$ aliphatic alpha olefins using catalyst as describe in U.S. Pat. Nos. 2,957,930, 3,997,129, 3,985,822, 4,431,570, 4,431,571 and 4,431,572 which are incorporated herein as references.

In general, the hydrocarbon feedstock to produce the polyalpha olefin may comprise 1-butene, trans-2-butene, cis-2-butene, isobutylene 2-methyl-1-propene, 1-pentene, 4-methylpentene-1, 1-hexene, 1-octene and 1-nonene or mixtures of the above. The ratio of the above mentioned alpha olefins selected may range from about 5 to 95 and about 95 to 5 weight percent. Ethylene and propylene feedstocks may also be incorporated as comonomers up to about 20 weight percent with the $C_4$ to $C_{16}$ polyalpha olefins. It is preferred that the hydrocarbon feedstock contain 10% by weight of isobutylene.

The polybutene polymers contemplates in this invention are $C_4$ to $C_{16}$ polymers. The polybutene polymyers are prepared by polymerizing a mixture of $C_4$ to $C_{16}$ olefins by methods that are well known in the art to obtain a $C_4$ to $C_{16}$ olefin polymer with a number average molecular weight range of from about 100 to about 5,000 g/mol as determined by gel permeation chromatography. Generally speaking, the polymerization reaction is a Friedel-Crafts reaction using a catalyst such as aluminum chloride or boron trifluoride and is disclosed extensively in the paterst and technical literature. The hydrocarbon feedstock may be a refinery fraction, a pure monoolefin, or a mixture of monoolefins. Monoolefin feedstock where the olefin contains 3 to 16 carbon atoms is preferred. If a pure olefin is used which is gaseous under ambient conditions, it is necessary either to control the reaction pressure or to dissolve the olefin in a solvent medium, inert under the reaction conditions, in order to maintain the olefin in the liquid phase. In the case of isobutylene, which is typical of monoolefins, the feedstock used in the polymerization process may be pure isobutylene or a mixed $C_4$ to $C_{16}$ hydrocarbon feedstock such as that resulting from the thermal or catalytic cracking operation. This is a liquid when under pressure and hence no diluent is needed.

The polymerization temperature is selected based on the molecular weight desired in the product. As is well known in the art, lower temperatures are used for obtaining higher molecular weight products while higher temperatures are used to obtain lighter products. The polymerization can be carried out in the full range of temperatures generally associated with conventional polybutene polymerization, i.e., about 100° C. to about 50° C.

The resulting $C_4$ to $C_{16}$ polymer typically includes various forms of butene, for example isobutene, 1-butene, trans-2-butene, cis-2-butene, and can contain a small amount of propene and minor amounts of polymerization byproducts. For simplicity, the typical polymer is referred to herein as polybutene polymer. Typically, isobutene constitutes from about 80% to about 95% of the total polybutene polymer. The polybutene polymer has at least one double bond per molecule. However, hydrogenated polybutene polymers, such as those described in U.S. Pat. No. 5,177,277 are also useful in the present invention.

Polybutene, in general, is employed in the PC/ABS/SAN formulation in amounts of at least about 0.1–8 weight percent, preferably about 0.2 to 5 weight percent, more preferably about 0.4 to 3 weight percent, and most preferably about 0.5 to 2.5 weight percent of the total composition.

Epoxidized polyalpha olefins are described in U.S. Pat. No. 3,382,255 where the polyalpha olefin is dissolved in heptane or other appropriate solvent and reacted with 40% performic, peracetic, perbenzoic, perphthalic acid and others.

Other functionalized polyalpha olefins included as part of this invention include maleic anhydride, maleimide, N-alkyl substituted maleimide, N-aryl or N-substitute aryl maleimides.

Polybutene polymers are commercially available in a variety of grades from Amoco Chemical Company. Included within the present invention are polybutene polymers which are homopolymer, copolymer, unsaturated, hydrogenated and functionalized polymers.

In addition, certain additives can be included in the resin composition of the present invention, such as antistatic agents, fillers, pigments, dyes, antioxidants heat stabilizers, ultraviolet light absorbers, lubricants and other additives commonly employed in polycarbonate/ABS blends.

Suitable stabilizers which may optionally be incorporated into the resin blend of the present invention include, but are not limited to hindered phenolic antioxidants, for example Irganox® 1076, Irgafox® 168, phosphites, for example, Ultranox® 626, Ultranox® 257, and thioesters, for example dilaurylthiodipropionate, etc.

Suitable antistatic agents which may optionally be incorporated into the resin blend of the present invention include, but are not limited to the reaction products of polyethyleneoxide block polymers with epichlorohydrin, polyurethanes, polyamides, polyesters or polyetheresteramides.

Suitable flame retardants are phosphorus compounds, most commonly phosphonates or phosphates as described in U.S. Pat. No. 4,178,281 which may optionally be incorporated into the resin blend of the present invention. For example these kind of compound include, but are not limited to RDP (resorcinol diphosphate), TPP (triphenyl phosphate), PTFE and halogenated materials, etc.

Suitable fillers which may optionally be incorporated into the resin blend of the present invention include, but are not limited to talc, glass fiber, calcium carbonate, carbon fiber, clay silica, mica and conductive metals, etc.

Suitable mold release agents which may optionally be incorporated into the resin blend of the present invention include, but are not limited to PETS (pentaerythritol tetrastearate) and glyceryl monostearate.

DETAILED DESCRIPTION OF THE PREFERRED EMBODIMENTS

The invention is more easily comprehended by reference to specific embodiments which are representative of the invention. It must be understood, however, specific embodiments are provided only for the purposes of illustration and understanding, and that the invention may be practiced otherwise than as specifically illustrated and described without departing from its spirit and scope.

Blends containing the ingredients listed in Tables I, II and III (expressed as parts by weight) were prepared by Henshel blending the components for about 1 minute, and then the blend was added into the hopper of the extruder. In a typical small scale lab experiment, a twin screw co-rotating intermeshing 10- barrel WP 30 mm extruder was used to compound these blends at 320–400 RPM with melt temperature of approximately 550° F. The compounded materials were injection molded according to ASTM D1897 in a Toshiba ISE170 injection molding machine using side-gated test mold into test specimens for mechanical properties. Test specimens were 3.2±0.2 mm thick unless otherwise specified. ASTM test procedures were as follows:

| | |
|---|---|
| D256 | Notched Izod impact |
| D3835 | Capillary Melt Viscosity |
| D638 | Tensile Strength, Modulus and Elongation |
| D790 | Flexural Modulus and Strength |
| D3763/GM9904P* | Multi-Axial Impact (Dynatup) |

*GM9904P refers to the General Motors Engineering Standard materials and processes - plastics and procedures

EXAMPLE 1

Ingredients used in this example are:

| | |
|---|---|
| PC1 | Polycarbonate having a weight average molecular weight of 47,000–53,000; |
| PC2 | polycarbonate having a weight average molecular weight of 33,000–38,000; |
| ABS HRG 1 | ABS with 50 ± 2% butadiene rubber content; |
| ABS HRG 2 | ABS with 50 ± 2% butadiene rubber content, lower graft SAN molecular weight compared to ABS HRG 1; |
| SAN 1 | Styrene-acrylonitrile copolymer having a weight average molecular weight of 90,000–102,000; |
| SAN 2 | Styrene-acrylonitrile copolymer having a weight average molecular weight of 55,000–67,000; |
| Indopol® L-14: | Polybutene copolymer of isobutylene and butene from Amoco having a number average molecular weight of 370; |
| Indopol® H-100: | Polybutene copolymer of isobutylene and butene from Amoco having a number average molecular weight of 940; |
| Irganox® 1076 | Octadecyl 3-(3,5-di-t-butyl-4-hydroxyphenyl)propionate from CIBA-GEIGY; |
| PETS | Pentaerythritol tetrastearate |

In this example, improvement of ductility, especially at low temperature is demonstrated while a lower molecular weight PC is blended by adding a small amount of polybutene Indopol L-14 or polybutene Indopol H-100.

TABLE I

| Ingredients/Blend# | 1 | 2 | 3 | 4 | 5 | 6 |
|---|---|---|---|---|---|---|
| PC 1 | 65 | 9.7 | 9.7 | 9.7 | 9.7 | 9.7 |
| ABS HRG 1 | 19 | 19 | 19 | 19 | 19 | 19 |
| SAN 1 | 16 | 16 | 16 | 16 | 16 | 16 |
| PC 2 | 0 | 55.3 | 55.3 | 55.3 | 55.3 | 55.3 |
| Polybutene Indopol L-14 | 0 | 0 | 4 | 0 | 2 | 6 |
| Polybutene Indopol H-100 | 0 | 0 | 0 | 4 | 0 | 0 |
| Irganox 1076 | 0.08 | 0.08 | 0.08 | 0.08 | 0.08 | 0.08 |
| PETS | 0.15 | 0.15 | 0.15 | 0.15 | 0.15 | 0.15 |
| Melt Viscosity @ 550° F. | | | | | | |
| 100/sec. | 4795 | 2337 | 2780 | 3425 | 2982 | 2539 |
| 500/sec. | 2710 | 1500 | 1750 | 1900 | 1850 | 1600 |
| 1000/sec. | 1897 | 1156 | 1274 | 1425 | 1360 | 1185 |
| 1500/sec. | 1498 | 963 | 1064 | 1167 | 1129 | 985 |
| 2500/sec. | 1091 | 736 | 813 | 878 | 863 | 762 |
| N. Izod (ft.-lb./in.) | | | | | | |
| RT | 13.37 | 5.43 | 10.01 | 10.16 | 10 | 9.94 |
| St. Dev. | 0.83 | 0.526 | 0.1 | 0.304 | 0.478 | 0.316 |
| −40° F. | 7.64 | 1.52 | 3.56 | 3.77 | 3.52 | 4.54 |
| St. Dev. | 1.88 | 0.417 | 0.13 | 0.343 | 0.266 | 1.69 |
| Dynatup, −30° C., 0.125" disc. (11'/sec., 50#) | | | | | | |
| Total Eng. (ft.-lb.) | 40.23 | 34.01 | 39.04 | 39.64 | 40.1 | 38.86 |
| St. Dev. | 2.2 | 6.52 | 2.43 | 2.34 | 2.52 | 2.75 |
| Max. Eng. (ft.-lb.) | 38.11 | 32.37 | 37.33 | 38.04 | 37.91 | 36.25 |
| St. Dev. | 2.11 | 5.8 | 2.18 | 2.19 | 2.1 | 1.73 |
| D/SD/B* | 10/0/0 | 0/0/10 | 8/2/00 | 8/2/00 | 8/2/00 | 8/2/00 |

*referred to as Ductile/Semi-ductible/Brittle failure mode defined by General Motors Engineering standard GM9904P.

Failures are classified visually from multi-axial testing using a 0.5 inch diameter tup on a 3 inch span. Ductile Failure exhibit a clean, stress whitened puncture of the test plaque without cracks radiating more than 10 mm beyond the center of the impact point. Brittle failures exhibit complete shattering of the test plaque, material punched out from the plaque, cracks or splits extending beyond the clamp ring. Semi-ductile failures fall between these classifications and may show smooth, stress-whitened failures.

EXAMPLE 2

In this example, it is shown by using a high flow SAN, the melt viscosity of the blend is significantly decreased at the sacrifice of ductility, especially at low temperature. Employing a small amount of polybutene Indopol L-14 or Indopol L-65 significantly increased RT Izod, low temperature Izod impact and more important, the %ductile or semi-ductile failure mode of the Dynatup test. Same compounding, molding and testing procedure was used as in Example 1.

In this example, Indopol L-65 is a polybutene copolymer of isobutylene and butene from Amoco having a number average molecular weight of 435;

TABLE II

| Ingredients/Blend # | 7 | 8 | 9 | 10 | 11 | 12 | 13 |
|---|---|---|---|---|---|---|---|
| PC 1 | 65 | 69 | 69 | 69 | 69 | 69 | 69 |
| ABS HRG 2 | 19 | 15 | 15 | 15 | 15 | 15 | 15 |
| SAN 1 | 16 | | | | | | |
| SAN 2 | | 16 | 16 | 16 | 16 | 16 | 16 |
| Irganox 1076 | 0.08 | 0.08 | 0.08 | 0.08 | 0.08 | 0.08 | 0.08 |
| PETS | 0.15 | 0.15 | 0.15 | 0.15 | 0.15 | 0.15 | 0.15 |
| pButene L-14 | | | 0.5 | 1 | 1.5 | 2 | |
| pButene L-65 | | | | | | | 2 |
| Melt Viscosity @ 550° F. | | | | | | | |
| 100/sec. | 5601 | 3264 | 3183 | 3304 | 3183 | 3183 | 3062 |
| 500/sec. | 2950 | 1900 | 1880 | 1880 | 1860 | 1830 | 1790 |
| 1000/sec. | 2040 | 1453 | 1417 | 1417 | 1392 | 1356 | 1347 |
| 1500/sec. | 1607 | 1210 | 1178 | 1175 | 1148 | 1137 | 1132 |
| 2500/sec. | 1163 | 928 | 894 | 901 | 889 | 871 | 871 |
| N. Izod (ft.-lb/in.), RT | | | | | | | |
| Ave. | 13.5 | 14.4 | 14.11 | 15.42 | 14.89 | 13.57 | 14.96 |
| St. Dev. | 0.62 | 1.19 | 0.67 | 1.44 | 1.03 | 0.88 | 1.37 |
| N. Izod (ft.-lb/in.) −40° C. | | | | | | | |
| Ave. | 10.01 | 3.08 | 6.98 | 6.48 | 9.89 | 8.2 | 9.36 |
| St. Dev. | 0.66 | 0.62 | 1.67 | 2.46 | 1.46 | 1.43 | 1.49 |
| Dynatup, −30° C., 0.125" disc (22'/sec., 25#) | | | | | | | |
| Fall Eng. (ft.-lb.) | 40.78 | 45.87 | 45.99 | 46.67 | 47.28 | 46.67 | 47.06 |
| St. Dev. | 2.09 | 1.55 | 2.15 | 1.85 | 1.33 | 2.58 | 2.51 |
| Max. Eng. (ft.-lb.) | 37.8 | 42.89 | 42.83 | 43.45 | 44.22 | 43.66 | 43.12 |
| St. Dev. | 2.06 | 1.84 | 2.73 | 1.96 | 2.46 | 2.92 | 4.58 |
| D/DP/B | 10/0/0 | 2/6/02 | 6/4/00 | 6/4/00 | 6/4/00 | 7/3/00 | 6/4/00 |
| Tensile Strength (1/8", 73° F., 2 In./min.) | | | | | | | |
| Strength Yld. (psi) | 8079 | 8366 | 8335 | 8279 | 8232 | 8249 | 8214 |
| Strength Fail (psi) | 8931 | 9052 | 9096 | 9068 | 9030 | 8997 | 8083 |
| Elong. Brk (%) | 201 | 195 | 200 | 202 | 203 | 203 | 166 |

EXAMPLE 3

Vikopoi ® is registered trade mark of Elf Atochem North America for epoxidized polybutene.

Vikopol ®24: a mixture of >95% copolymer of epoxidized 1-butene, 2-butene and 2-methyl-1-propene with <5% of butene homopolymer. Flash point 309° F.

Vikopol ®64: a mixture of >95% copolymer of epoxidized 1-butene, 2-butene and 2-methyl-1-propene with <5% of butene homopolymer. Flash point 464° F.

TABLE III

| Ingredient blend # | 14 | 15 | 16 |
|---|---|---|---|
| PC 1 | 9.7 | 9.7 | 9.7 |
| ABS HRG 2 | 19 | 19 | 19 |
| SAN 1 | 16 | 16 | 16 |
| PC 2 | 56.3 | 56.3 | 56.3 |
| Vikopol ® 64 | | 4 | |
| Vikopol ® 24 | | | 4 |
| Irganox | 0.08 | 0.08 | 0.08 |
| PETS | 0.15 | 0.15 | 0.15 |
| Melt Viscosity @550oF | | | |
| 100/sec. | 2337 | 3062 | 2377 |
| 500/sec. | 1500 | 1850 | 1600 |
| 1000/sec. | 1156 | 1380 | 1205 |
| 1500/sec. | 963 | 1140 | 1018 |
| 2500/sec. | 736 | 868 | 785 |
| N. Izod Impact @ RT (ft.-lb/In) | | | |
| Ave. | 5.43 | 10.39 | 10.2 |
| St. Dev. | 0.53 | 0.16 | 0.11 |

TABLE III-continued

| Ingredient blend # | 14 | 15 | 16 |
|---|---|---|---|
| N. Izod impact @−40° C. (ft.-lb/in.) | | | |
| Ave. | 1.52 | 3.49 | 3.62 |
| St. Dev. | 0.42 | 0.43 | 0.31 |

TABLE III-continued

| Ingredient blend # | 14 | 15 | 16 |
|---|---|---|---|
| Dynatup, −30° C., 0.125" disc (11'/sec. 25#) | | | |
| Total Eng. (ft.-lb) | 34.01 | 38.6 | 39.76 |
| St. Dev. | 6.52 | 2.65 | 3.52 |
| Max. Eng. (ft.-lb.) | 32.37 | 37.17 | 38.05 |
| St. Dev. | 5.8 | 2.4 | 3.55 |
| D/SD/B | 0/0/10 | 2/8/0 | 2/8/0 |

As shown in the above Table, improvement in ductility can be achieved by adding a small amount of functionalized polybutene, more specifically, epoxidized polybutene.

What is claimed is:

1. A thermoplastic composition comprising:
   (A) from 10 to 90 percent by weight of one or more polycarbonate resins;
   (B) from 5 to 50 percent by weight of rubber grafted terpolymer;
   (C) from 5 to 70 percent by weight of a styrenic resin; and
   (D) from 0.1 to 8.0 percent by weight of an aliphatic $C_4$ to $C_{16}$ polyalpha olefin polymer having a number average molecular weight of from about 100 to about 5000 g/mol as determined by gel permeation chromatography.

2. The thermoplastic composition of claim 1, wherein the thermoplastic composition comprises from 0.25 to 2.5 percent by weight of the aliphatic $C_4$ to $C_{16}$ polyalpha olefin polymer.

3. The thermoplastic composition of claim 1, wherein said aliphatic $C_4$ to $C_{16}$ polyalpha olefin polymer is made by polymerizing one or more monoolefins selected from the group consisting of 1-butene, trans-2-butene, cis-2-butene, isobutylene, 2-methyl-1-propene, 1-pentene, 4-methylpentene4, 1-hexene, 1-octene and 1-nonene and mixtures thereof.

4. The thermoplastic composition of claim 1, wherein the aliphatic $C_4$ to $C_{16}$ polyalpha olefin polymer is made by polymerizing one or more $C_4$ to $C_{16}$ monoolefins, optionally including up to 20 weight percent ethylene as a comonomers, wherein the relative amount of ethylene is based on the combined weight of $C_4$ to $C_{16}$ monoolefins and ethylene.

5. The thermoplastic composition of claim 1 wherein the aliphatic $C_4$ to $C_{16}$ polyalpha olefin polymer is made by polymerizing one or more $C_4$ to $C_{16}$ monoolefins, optionally including up to 20 weight percent propylene as a comonomers, wherein the relative amount of propylene is based on the combined weight of $C_4$ to $C_{16}$ monoolefins and propylene.

6. The thermoplastic composition of claim 1, wherein said polycarbonate resins have a weight average molecular weight of from about 18,000 to about 57,000.

7. The thermoplastic composition of claim 1, further comprises at least one additional component selected from mineral fillers, fibers, stabilizers, colorants, antistatic additives and lubricants.

8. A thermoplastic composition comprising:
   (A) from 10 to 90 percent by weight of one or more polycarbonate resins;
   (B) from 5 to 50 percent by weight of rubber grafted terpolymer resins;
   (C) from 5 to 70 percent by weight of a styrenic resin; and
   (D) from 0.1 to 8.0 percent by weight of a functionalized aliphatic $C_4$ to $C_{16}$ polyalpha olefin polymer having a number average molecular weight of from about 100 to about 5000 g/mol, as determined by gel permeation chromatography.

9. The thermoplastic composition of claim 8, wherein the thermoplastic composition comprises from 0.25 to 2.5 percent by weight of the functionalized aliphatic $C_4$ to $C_{16}$ polyalpha olefin polymer.

10. The thermoplastic composition of claim 8, wherein said functionalized aliphatic $C_4$ to $C_{16}$ polyalpha olefin polymer is made by polymerizing one or more monoolefins selected from the group consisting of 1-butene, trans-2-butene, cis-2-butene, isobutylene, 2-methyl-1-propene, 1-pentene, 4-methylpentene-1, 1hexene, 1-octene and 1-nonene and mixtures thereof.

11. The thermoplastic composition of claim 8, wherein the functionalized aliphatic $C_4$ to $C_{16}$ polyalpha olefin polymer is made by polymerizing one or more $C_4$ to $C_{16}$ monoolefins, optionally including up to 20 weight percent ethylene as a comonomer, wherein the relative mount of ethylene is based on the combined weight of $C_4$ to $C_{16}$ monoolefins and ethylene.

12. The thermoplastic composition of claim 8, wherein the functionalized aliphatic $C_4$ to $C_{16}$ polyalpha olefin polymer is made by polymerizing one or more $C_4$ to $C_{16}$ monoolefins, optionally including up to 20 weight percent propylene as a comonomers, wherein the relative amount of propylene is based on the combined weight of $C_4$ to $C_{16}$ monoolefins and propylene.

13. The thermoplastic composition of claim 8, wherein said polycarbonate resins have a weight average molecular weight of from about 18,000 to about 55,000.

14. The thermoplastic composition of claim 8, wherein said aliphatic $C_4$ and $C_{16}$ polyalpha olefin is epoxy-functionalized.

15. The thermoplastic composition of claim 1, wherein the an aliphatic $C_4$ to $C_{16}$ polyalpha olefin polymer is a copolymer of isobutylene and butene.

16. The thermoplastic composition of claim 1, wherein the an aliphatic $C_4$ to $C_{16}$ polyalpha olefin polymer is an epoxidized polybutene or a copolymer of epoxidized 1-butene, 2-butene and 2-methyl-1-propene.

* * * * *